United States Patent
Payne et al.

(10) Patent No.: US 6,753,990 B1
(45) Date of Patent: Jun. 22, 2004

(54) HOLOGRAPHIC DISPLAYS

(75) Inventors: Douglas Payne, Malvern (GB); Christopher W. Slinger, Malvern (GB)

(73) Assignee: Holographic Imaging LLC, Birmingham, MI (US)

( * ) Notice: Subject to any disclaimer, the term of this patent is extended or adjusted under 35 U.S.C. 154(b) by 0 days.

(21) Appl. No.: 09/926,733
(22) PCT Filed: May 18, 2000
(86) PCT No.: PCT/GB00/01901
§ 371 (c)(1), (2), (4) Date: Mar. 1, 2002
(87) PCT Pub. No.: WO00/75698
PCT Pub. Date: Dec. 14, 2000

(30) Foreign Application Priority Data

Jun. 9, 1999  (GB) .............................. 9913269

(51) Int. Cl.⁷ ................................................ G03H 1/26
(52) U.S. Cl. ............................ 359/22; 359/17; 359/15; 359/272; 359/292; 349/24
(58) Field of Search ............................ 359/22, 17, 292, 359/272, 15; 349/21, 22, 24

(56) References Cited

U.S. PATENT DOCUMENTS 5,132,839 A * 7/1992 Travis ........................ 359/462
6,436,490 B1 * 8/2002 Nishimura et al. .......... 428/1.1

* cited by examiner

Primary Examiner—Drew A. Dunn
Assistant Examiner—Fayez Assaf
(74) Attorney, Agent, or Firm—Arent Fox

(57) ABSTRACT

A holographic display comprises a light source and an Electrically Addressable Spatial Light Modulator (EASLM) 1 in the path of the light source. A light guide is arranged to guide light from the EASLM to each of a set of tiled regions of a OASLM in turn. The Optically Addressable Spatial Light Modulator (OASLM) 8 has a monostable light modulation property which is changed from a first state to a second state by incident light.

7 Claims, 1 Drawing Sheet

HOLOGRAPHIC DISPLAYS

The present invention relates to holographic displays and in particular to holographic displays which use an electrically addressable spatial light modulator to generate modulated light for projection onto an optically addressable spatial light modulator.

It is well known that a three-dimensional image may be presented by forming an interference pattern or hologram on a planer surface. The three-dimensional image is visible when the hologram is appropriately illuminated. Recently, interest has grown in so-called computer generated holograms (CGHs) which offer the possibility of displaying high quality images, which need not be based upon real objects, with appropriate depth cues and without the need for viewing goggles. Interest is perhaps most intense in the medical and design fields where the need for realistic visualisation techniques is great.

Typically, a computer generated hologram involves the generation of a matrix of data values (each data value corresponding to a light transmission level) which simulates the hologram which might otherwise be formed on a real planer surface. The matrix is applied to an Electrically Addressable Spatial Light Modulator (EASLM) which may be, for example, a two-dimensional array of liquid crystal elements or of acousto-modulators. Coherent light is directed onto the EASLM using for example a laser such that the resulting output, either reflected from the EASLM or transmitted through the EASLM, is a modulated light pattern.

In order to produce a three-dimensional image of usable size and viewing angle, the EASLM typically has to have a large number of pixels, e.g. $10^{10}$. In addition, the pixels of the EASLM must be positioned relative to one another with a high degree of accuracy. The device must also be capable of modulating coherent light, e.g. produced by a laser. These requirements are extremely demanding and expensive to achieve in practice.

An alternative approach is presented in GB2330471A, referred to as Active Tiling™, which describes the use of a relatively small EASLM in combination with a relatively large Optically Addressable Spatial Light Modulator (OASLM). The holographic matrix is subdivided into a set of contiguous tiles, with the data for each tile being passed in turn to the EASLM. The OASLM comprises a sheet of bistable liquid crystal (in one example the liquid crystal is a ferroelectric liquid crystal) which is switched from a first to a second state by incident light. Guide optics, disposed between the EASLM and the OASLM, cause the output of the EASLM to be stepped across the surface of the OASLM. The bistable nature of the OASLM liquid crystal means that the portion of the OASLM onto which an image tile is projected, remembers that image until such time as the OASLM is reset by the application of an electrical voltage. It will be appreciated that providing a reset voltage is applied only at the end of a complete scan, immediately prior to reset the OASLM will have "stored" in it a replica of the complete holographic matrix.

The requirement of the display of GB2330471A for the OASLM to have memory, is quite demanding and is expensive to implement in practice. Furthermore, the need to reset the OASLM at the end of each scan, requiring as it does the use of surface electrodes, adds complexity and therefore yet more expense to the holographic display.

It is an object of the present invention to overcome or at least mitigate the above noted disadvantages. This and other objects are achieved at least in part by providing a holographic display for displaying a computer generated hologram comprising sub-holograms, the display having an OASLM where the modulation property of the OASLM is monostable.

According to a first aspect of the present invention there is provided a holographic display comprising:
  a light source;
  an Electrically Addressable Spatial Light Modulator (EASLM) in the path of the light source;
  an Optically Addressable Spatial Light Modulator (OASLM) having a monostable light modulation property which is changed from a first state to a second state by incident light; and
  light guiding means arranged to guide light from the EASLM to each of a set of tiled regions of the OASLM in turn.

The present invention takes advantage of the "memory" which is inherent in the human eye. Providing that the light output from each OASLM tile is modulated with sufficient amplitude, an observer will remember the image produced by that tile at least for the time it takes to complete a scan of the OASLM.

It will be appreciated that the holographic image data temporarily recorded at the OASLM may be read out in a number of different ways. For example, in a transmission mode, "readout" light is directed onto the OASLM from the same side as the "write" light and passes through the OASLM. Providing that the readout and write light are of different wavelengths, the write light can be prevented from reaching the viewer by means of optical filters. In a reflection mode, the readout light illuminates the OASLM from the opposite side of the OASLM than the write light. The write light is prevented from passing through the OASLM by an absorbing layer.

In one embodiment of the invention, the EASLM is arranged to be driven in turn by a sequence of sub-holograms which together (e.g. when tiled) form a complete holographic image frame. The light guiding means is synchronised with the tile update rate of the EASLM such that the sub-holograms are mapped onto respective tiles of the OASLM. Preferably, the sub-holograms are such that the OASLM produces a discrete set of wavefronts which converge on an object point.

The monostable nature of the modulation property of the OASLM is preferably such that the property decays from said second state to approximately said first state in a time which is of the same order as the frame update rate, i.e. the time taken to display a complete set of sub-holograms. More preferably, the modulation property decays to approximately the first state in a time which is less than the frame update rate. Due to the monostable nature of the modulation property, there is no requirement to re-set the modulation property at the end of a complete scan (i.e. a frame update). It will also be appreciated that the availability and affordability of monostable OASLMs is greater than that of bistable OASLMs.

It is noted that said tiled regions may be overlapping or contiguous with one another or may be spaced apart.

According to a second aspect of the present invention there is provided a method of displaying a hologram, the method comprising:
  driving an Electrically Addressable Spatial Light Modulator (EASLM) with computer generated holographic data;
  directing light onto the EASLM; and
  guiding light output from the EASLM to an Optically Addressable Spatial Light Modulator (OASLM) having a monostable light modulation property, said light being guided to each of a set of tiled regions of the OASLM in turn.

For a better understanding of the present invention and in order to show how the same may be carried into effect reference will now be made, by way of example, the accompanying drawings, in which.

Figure 1:
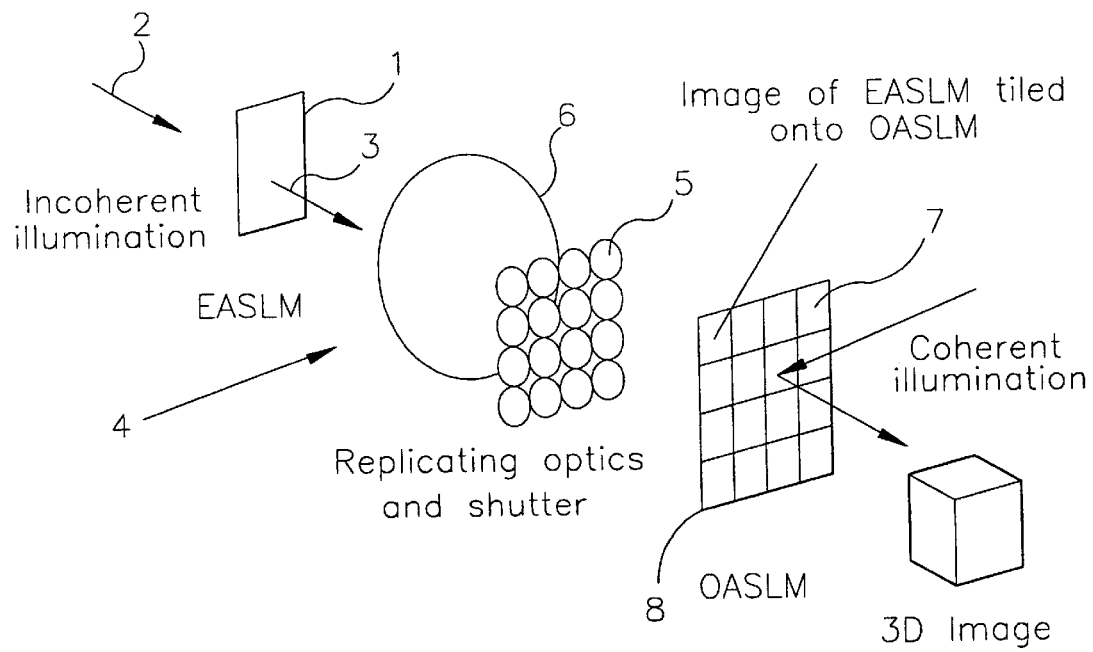
FIG. 1 illustrates an Active Tiling™ holographic display system.

There is illustrated schematically in FIG. 1 an Active Tiling™ holographic display which, apart from the nature of the OASLM (to be described below), is known. The display comprises an Electrically Addressable Spatial Light Modulator (EASLM) 1 which is arranged to receive holographic image data from a computer (not shown). The EASLM 1 may be for example an acousto-optic modulator which is sub-divided into a matrix of modulation elements or an array of liquid crystal elements.

The image data received from the computer comprises a series of sub-holograms (e.g. hogels, holographic stereograms, or phase added stereograms) each consisting of a matrix of phase modulation data: when tiled together, these matrices provide a complete data array defining a hologram. The sub-hologram matrices are passed to the EASLM 1 in a raster-scan like sequence, i.e. row by row. The sub-holographic matrices are mapped in turn to the EASLM modulation elements, with the data (or rather a corresponding voltage) at each matrix point being assigned to a corresponding modulation element. A beam of incoherent light 2, provided for example by a laser or light emitting diode (not shown), is directed onto the surface of the EASLM 1. Light 3 transmitted through the EASLM 1 is modulated by an amount determined by the voltage applied to the modulation element through which it passes. Light 3 transmitted through the EASLM 1 is directed towards a light guiding system 4. The light guiding system 4 comprises a 5×5 array of light directing lenses 5. Disposed between the lenses 5 and the EASLM 1 is a 5×5 array of electronically controlled shutters 6. The shutter array 6 is aligned with the lens array 5 and is controlled by control signals received from the computer which generates the holographic image data. The control signals are synchronised with the image data provided by the computer to the EASLM 1, such that only one shutter 6 is open at any one time. In addition, each shutter 6 is open for approximately the duration for which a sub-hologram image is present on the EASLM. The shutters 6 are opened in a raster scan sequence, from left to right and row by row.

Each lens of the lens array 5 is arranged to guide light, transmitted through the shutter 6 with which it is aligned, onto to a corresponding region (referred to as a "tile") 7 of an Optically Addressable Spatial Light Modulator (OASLM) 8. The result of the synchronisation between the switching of the EASLM 1 between sub-holograms, and the opening of the shutters of the array 6, is that the each sub-hologram is projected in turn onto the corresponding tile 7 of the OASLM 8.

The OASLM 8 is a substantially planer device which has the property that light incident on a front surface of the device is modulated by an amount which depends upon the amplitude of light incident upon the corresponding region of the device's rear surface. Thus, coherent light 8 incident on the device's front surface will be modulated with a spatial pattern which corresponds to the spatial pattern of light incident on the device's rear surface. More particularly, the OASLM 8 is such that its modulation property is monostable (rather than bistable). That is to say that the modulation property is changed from a first state by a second state by light incident on the rear surface of the modulator. When the shutter 6 disposed behind the corresponding lens of the lens array 5 is closed, and the light ceases to be incident on the corresponding tile 7, the modulation property decays back to the first state. This decay happens without the need for any re-set voltage or other re-set signal. The decay time is typically less than the time taken to scan the entire OASLM 8. This monostable light modulation property is achieved by using for example a liquid crystal device comprising a conventional nematic liquid crystal.

It is well known that the human eye and brain remember an image for a short time after that image has ceased to exist, providing that the intensity of the image is sufficiently great. The greater the intensity of the image, the longer the memory. The display device described here takes advantage of this perceptual memory by displaying a single tile 7 of the OASLM 8 for a time which is less than the total time which it takes to scan the entire OASLM 8. That is to say that at any given time during the scanning process, only a fraction of the tiles 7 may actually be presenting an image. At the end of a frame scan, the eye will perceive the complete image frame, even though only a fraction of the tiles 7 making up that frame are actually displayed an image.

It is noted that the embodiment described here is particularly suited to holograms composed of "hogels" (a type of sub-hologram). Hogels are described in the article "Holographic Bandwidth Compression Using Spatial Subsampling", M. Lucente, Optical Engineering, Vol. 35, No.6, June 1996. The use of hogels takes into account the finite resolution of the human eye to minimise the information content of the computer generated hologram (resulting in a lower resolution image). Hogels offer a method of computation which is potentially fast.

Figure 2:
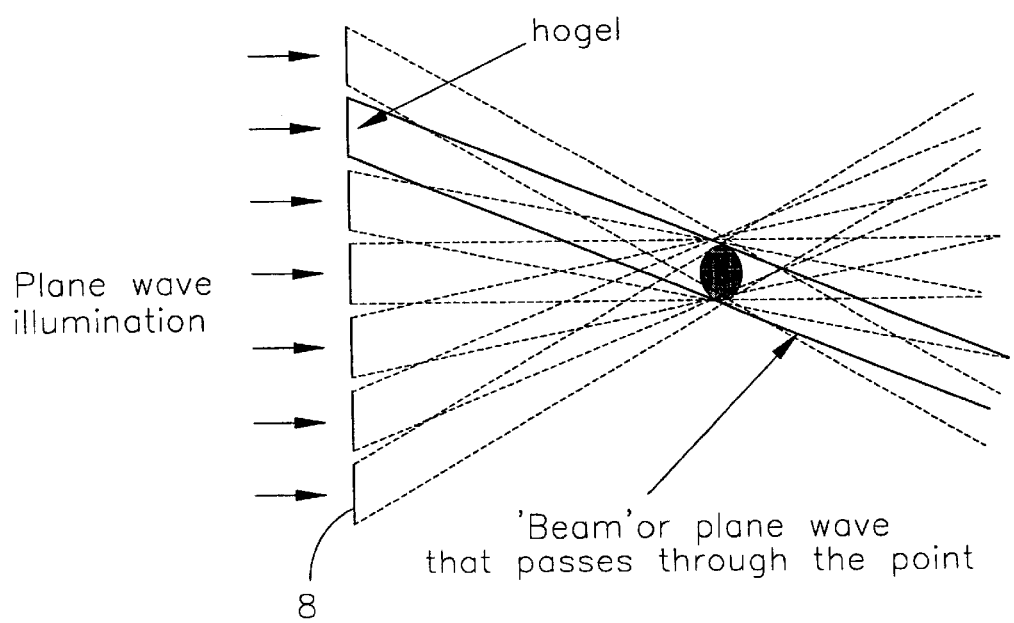
FIG. 2 illustrates the display of a point using the display of FIG. 1 where a three-dimensional image is constructed using a set of hogels.

In essence, each hogel can be envisaged as diffracting beams of light into a number of directions. For each direction there is a corresponding fringe pattern that can be obtained from a look-up table. The brightness of beams in any direction (or indeed whether there is a beam at all) is determined by whether the beam passes through a point on the 3D object and the brightness of the object at that point. The hogel to be displayed is the linear summation of all these fringe patterns, appropriately weighted to provide the required intensity in the image. The resolution of the image is approximately determined by the hogel size, so an attempt is made to match this size to the resolution of the viewer's eyes. This resolution matching is where minimisation of the computation time is expected to be achieved. FIG. 2 illustrates the hogel 3D display principle.

One of the features of the hogel method is that, whilst each hogel needs to be illuminated with coherent light, the hogels can be incoherent with respect to each other. For the purpose of this discussion, the term discrete coherence (not to be confused with partial coherence) will be used to describe this. It is expected that such a discrete coherent display system would have reduced speckle in the image.

It is recognised here that a modified Active Tiling™ system could be particularly suited to provide discrete coherently illuminated hogels. The concept used is that the hogels are illuminated with coherent light, time sequentially, so that at any one time, the eye receives light from only one hogel. The 3D image is built up in the eye as it integrates the light contributions from all the hogels over time. This is an incoherent process. The tiling process of the Active Tiling™ system is, of course, time sequential. The speed of the time sequential illumination would need to be faster than the image latency of the eye (e.g. video frame rates).

It will be appreciated by the person of skill in the art that various modifications may be made to the above described embodiments without departing from the scope of the present invention. For example, the device described above may provide a single channel of a multi-channel holographic display. That is to say that a number of display devices may be arranged in an array such that the output provides a single hologram.

What is claimed is:

1. A holographic display comprising:
    a light source;
    an Electrically Addressable Spatial Light Modulator (EASLM) in the path of the light source;
    an Optically Addressable Spatial Light Modulator (OASLM) having a monostable light modulation property which is changed from a first state to a second state by incident light; and
    light guiding means arranged to guide light from the EASLM to each of a set of tiled regions of the OASLM in turn.

2. A display according to claim 1, wherein said tiled regions are present on a first surface of the OASLM and the device comprises a second light source arranged to direct a beam of light onto a second opposite surface such that the light is reflected from the second surface after modulation.

3. A display according to claim 1, wherein the EASLM is arranged to be driven in turn by a sequence of sub-holograms which together form a complete holographic image frame, and the light guiding means is arranged to be synchronized with a tile update rate of the EASLM such that in use the sub-holograms are mapped onto respective tiles of the OASLM.

4. A display according to claim 3, wherein said sub-holograms are such that the OASLM produces a discrete set of wavefronts which converge on an object point.

5. A display according to claim 3, wherein the monostable nature of the modulation property of the OASLM is such that in use the property decays from said second state to approximately said first state in a time which is of the same order as a frame update rate.

6. A display according to claim 5, wherein the modulation property of the OASLM decays in use to approximately the first state in the time which is less than the frame update rate.

7. A method of displaying a hologram, the method comprising:
    driving an Electrically Addressable Spatial Light Modulator (EASLM) with computer generated holographic data;
    directing light onto the EASLM; and
    guiding light output from the EASLM to an Optically Addressable Spatial Light Modulator (OASLM) having a monostable light modulation property, said light being guided to each of a set of tiled regions of the OASLM in turn.

* * * * *